US006388012B1

(12) United States Patent
Sakayama et al.

(10) Patent No.: US 6,388,012 B1
(45) Date of Patent: May 14, 2002

(54) THERMOSETTING POWDER RESIN COMPOSITION

(75) Inventors: Hiroyuki Sakayama; Yoshio Kikuta; Mitsuyuki Mizoguchi; Takahisa Miyawaki; Tsuyoshi Matsumoto, all of Kanagawa (JP)

(73) Assignee: Mitsui Chemicals, Inc. (JP)

( * ) Notice: Subject to any disclaimer, the term of this patent is extended or adjusted under 35 U.S.C. 154(b) by 0 days.

(21) Appl. No.: 09/543,089

(22) Filed: Apr. 4, 2000

(30) Foreign Application Priority Data

Apr. 13, 1999 (JP) .............................. 11-105460

(51) Int. Cl.⁷ .................. C08L 23/00; C08L 23/04; C08L 33/00; C08L 35/00; C09D 5/03
(52) U.S. Cl. ................. 525/191; 525/206; 525/207; 525/208; 525/213; 525/214; 525/255; 525/220; 525/221; 525/222; 525/223; 525/227; 525/231; 525/232; 525/240; 525/241
(58) Field of Search ................ 525/191, 206, 525/207, 208, 213, 214, 215, 220, 221, 222, 223, 227, 231, 232, 240, 241

(56) References Cited

U.S. PATENT DOCUMENTS

| 3,954,898 A | 5/1976 | Hirota et al. |
| 5,212,245 A | 5/1993 | Franks et al. |
| 5,270,391 A | * 12/1993 | Miyazaki et al. ........... 525/194 |
| 5,523,349 A | 6/1996 | Shiomi et al. |
| 5,648,117 A | 7/1997 | Shiomi et al. |
| 5,735,944 A | 4/1998 | Haubennestel et al. |

FOREIGN PATENT DOCUMENTS

| EP | 0 465 176 A | 1/1992 |
| EP | 0 544 206 A | 6/1993 |
| EP | 0 652 265 A | 5/1995 |
| FR | 2 255 350 | 7/1975 |
| JP | 57-49672 | 3/1982 |
| JP | 7-179789 | 7/1995 |
| JP | 08 209034 A | 8/1996 |
| JP | 9-227799 | 9/1997 |
| WO | WO97/23573 | 7/1997 |

* cited by examiner

*Primary Examiner*—Nathan M. Nutter
(74) *Attorney, Agent, or Firm*—Burns Doane, Swecker & Mathis, L.L.P.

(57) ABSTRACT

A thermosetting powder paint composition comprising (A) a resin composition component, (B) a hardener component and (C) a solid flow controlling component, wherein the component (A) contains a resin composition component having reactivity with the component (B), the component (B) contains a hardener having reactivity with the component (A), the component (C) contains a vinyl polymer which is solid at 20° C., and the relation between $SP_A$ of the component (A) and $SP_C$ of the component (C) satisfies the following numerical formula (1) and the following numerical formula (2) simultaneously. By this constitution, excellent blocking-resistance in storing as the powder paint composition and excellent appearance properties of a paint film formed by coating the powder paint composition can be simultaneously manifested.

$$8 \leq SP_A \leq 13 \tag{1}$$

$$7 \leq SP_C \leq SP_A \tag{2}$$

20 Claims, No Drawings

THERMOSETTING POWDER RESIN COMPOSITION

BACKGROUND OF THE INVENTION (1) Field of the Invention

The present invention relates to a thermosetting powder paint composition, more particularly, to a thermosetting powder paint composition which has excellent storage stability (blocking-resistance and the like), appearance properties (cratering-resistance, cissing-resistance, smoothness, sharpness and the like), physical properties (hardness, scratch-resistance and the like) and chemical properties (weather-resistance, acid-resistance, solvent-resistance and the like) and particularly can provide a baked paint film suitable for vehicle painting use.

(2) Description of the Prior Art

Conventionally, solvent type paints are used for painting articles, and paints satisfying various requirements for use in fields such as automobiles and the like wherein strict qualities are required have been developed and used.

Recently, in the technical field of paints, change from solvent type paints to powder type paints (hereinafter, referred to as "powder paint") has been expected from the standpoints of local or global environmental protection, labor safety, environment improvement, prevention of fire and explosion, resource saving and the like. Further, along with an increase in expectation of high ability and variety of powder paints owing to historical or social requirements, powder paints have been required to exhibit high-grade paint film abilities (e.g., weather-resistance, acid rain-resistance, scratch-resistance and the like) corresponding to those of solvent type paints. However, irrespective of increased strictness of paint film abilities required for powder paints, it is not necessarily been found that powder paints completely satisfying these requirements have been available commercially. As specific examples of conventional powder paints, epoxy resin and polyester resin powder paints are, for example, listed. However, these paints not only have poor weather resistance but also poor resistance against acid rain which has turned into problems particularly recently, causing problems in the fields of automobile body paintings and the like.

For improving these defects, U.S. Pat. No. 3,954,898 (Japanese Patent Application Publication (JP-B) No. 48-38617) suggested an acrylic powder paint and realized remarkable improvement of weather-resistance. Thereafter, various studies have been made regarding acrylic powder paints. However, these acrylic powder paints did not fully satisfy simultaneously appearance properties, physical properties, chemical properties and storage stability, particularly smoothness and blocking-resistance. For improving smoothness, it is most effective to decrease melt viscosity. However, for decreasing melt viscosity, glass transition temperature should be lowered, and in such a method, it is impossible to satisfy both smoothness and blocking-resistance simultaneously.

Therefore, in conventional acrylic powder paints, an acryl polymer which is liquid at normal temperature (having low Tg) is used as a flow controlling agent for the purposed of improving smoothness and preventing cratering. Such studies have long been conducted, and there have been suggested paints or resin compositions for improving appearance properties, physical properties and chemical properties (Japanese Patent Application Laid-Open (JP-A) No. 57-49672, U.S. Pat. Nos. 5,523,349 and 5,648,117 (JP-A No. 7-179789) and the like). Further, as reactive flow controlling agents, there have been suggested compositions which contain reactive functional groups such as an amino group, carboxyl group, hydroxyl group, epoxy group and the like, in the molecule, and improve paint film physical properties by reacting with main components or hardener components in forming a paint film (U.S. Pat. No. 5,212,245 (JP-A No. 8-325480), WO 97/23573 (JP-A No. 9-227799) and the like). However, these flow controlling agents are all liquids at normal temperature (having low Tg), and are causes of reduction in the blocking-resistance of a paint. Further, these flow controlling agents are viscous liquids at normal temperature, causing problems also in workability in producing paints.

Recently, for improving such problems, flow controlling agents have been developed in which flow controlling components are adsorbed onto silica particles or wax to formulate them as a solid form (U.S. Pat. No. 5,735,944). However, also regarding these solid flow controlling agents, those in which flow controlling components are adsorbed onto silica particles have problems in transparency, appearance and the like of the paint film, and those in which flow controlling components are adsorbed onto wax have problems in scratch-resistance, re-coating property and the like. Therefore, such solid flow controlling agents have not provided a thermosetting powder paint composition satisfying all of storage stability, appearance properties, physical properties, chemical properties and the like.

SUMMARY OF THE INVENTION

The present invention provides, in view of the above-described problems of the conventional prior art, a thermosetting powder paint composition (for example, an acrylic thermosetting powder paint composition) having excellent storage stability, appearance properties, physical properties and chemical properties. Particularly, the present invention provides a thermosetting powder paint composition (for example, an acrylic thermosetting powder paint composition) which is suitably applied to painting, particularly to top painting of bodies of vehicles such as automobiles and the like and parts of vehicles such as automobiles and the like (aluminum wheel, wiper, pillar, door handle, fender, bonnet, air spoiler, stabilizer, front grill and the like).

More specifically, a thermosetting powder paint composition is provided which enables manifestation of excellent blocking-resistance in storing of a powder paint composition simultaneously with manifestation of excellent appearance properties when the paint composition is coated to give a paint film, which has been difficult to be realized by compounding a solid flow controlling agent of the prior art or a liquid flow controlling agent of the prior art into a powder paint composition.

The present inventors have intensively studied in order to solve the above-described problems of the prior art, and resultantly have developed a solid flow controlling agent (C) which is solid at 20 only composed of a vinyl-based polymer, particularly, a (meth)acrylic vinyl polymer without using raw materials such as silica particles, wax and the like and have found that a thermosetting powder paint composition (for example, an acrylic thermosetting powder paint composition) having excellent storage stability, appearance properties, physical properties and chemical properties can be provided by using the component (C), completing the present invention.

The present invention is specified by the following subjects [1] to [16].

[1] A thermosetting powder paint composition comprising (A) a resin composition component, (B) a hardener component and (C) a solid flow controlling component which is solid at 20, wherein the above-mentioned component (A) contains a resin composition component having reactivity with the component (B), the above-mentioned component (B) contains a hardener having reactivity with the component (A), the above-mentioned component (C) contains a vinyl polymer, and the relation between the solubility parameter $SP_A$ of the component (A) and the solubility parameter $SP_C$ of the component (C) satisfies the following numerical formula (1) and the following numerical formula (2) simultaneously:

$$8 \leq SP_A \leq 13 \quad (1)$$

$$7 \leq SP_C < SP_A \quad (2).$$

[2] The thermosetting powder paint composition according to [1] wherein the composition ratio of the resin composition component (A), the hardener component (B) and the solid flow controlling agent component (C) is controlled so that the amount of the component (C) is from 0.01 to 10% by weight based on the total weight of the component (A) and the component (B).

[3] The thermosetting powder paint composition according to [1] or [2] wherein the "resin composition component" in the component (A) includes a vinyl polymer.

[4] The thermosetting powder paint composition according to [3] wherein the "vinyl polymer" in the component (A) includes a (meth)acrylate vinyl polymer.

[5] The thermosetting powder paint composition according to [4] wherein the "(meth)acrylate vinyl polymer" in the component (A) is obtained by polymerization in a reaction system comprising (a-1) at least one (meth)acrylate monomer which has at least one radical polymerizable unsaturated double bond in one molecule and does not have other reactive functional group than the radical polymerizable unsaturated double bond, and (a-2) at least one (meth)acrylate monomer which has at least one radical polymerizable unsaturated double bond and at least one non-radical polymerizable functional group having reactivity with the hardener component (B) together in one molecule.

[6] The thermosetting powder paint composition according to [4] or [5] wherein the "non-radical polymerizable functional group having reactivity with the hardener component (B)" in the component (a-2) is a glycidyl group.

[7] The thermosetting powder paint composition according to any of [4] to [6] wherein the amount of the component (a-2) is from 20 to 60 parts by weight based on 100 parts by weight of the total weight of the component (a-1) and the component (a-2).

[8] The thermosetting powder paint composition according to any of [1] to [7] wherein the "resin composition component" in the component (A) has a glass transition temperature from 30 to 120.

[9] The thermosetting powder paint composition according to any of [1] to [8] wherein the "hardener" in the component (B) includes a polyvalent carboxylic acid and/or linear anhydride thereof.

[10] The thermosetting powder paint composition according to [9] wherein the "polyvalent carboxylic acid" in the component (B) is an "aliphatic polyvalent carboxylic acid".

[11] The thermosetting powder paint composition according to any of [1] to [10] wherein the "vinyl polymer" in the component (C) has a glass transition temperature (Tg) from 30 to 80° C.

[12] The thermosetting powder paint composition according to any of [1] to [11] wherein the "vinyl polymer" in the component (C) includes a (meth)acrylate vinyl polymer.

[13] The thermosetting powder paint composition according to any of [1] to [12] wherein the "vinyl polymer" in the component (C) is composed only of a (meth)acrylate vinyl polymer.

[14] The thermosetting powder paint composition according to any of [1] to [13] wherein the "vinyl polymer" in the component (C) has a number average molecular weight from 1000 to 20000.

[15] The thermosetting powder paint composition according to any of [1] to [14] wherein the relation between the solubility parameter $SP_A$ of the component (A) and the solubility parameter $SP_C$ of the component (C) satisfies the following numerical formula (3) and the following numerical formula (4) simultaneously:

$$8 \leq SP_A \leq 13 \quad (3)$$

$$7 \leq SP_C < SP_A - 1.2 \quad (4).$$

[16] The thermosetting powder paint composition according to any of [1] to [15] wherein the relation between the solubility parameter $SP_A$ of the component (A) and the solubility parameter $SP_C$ of the component (C) satisfies the following numerical formula (5) and the following numerical formula (6) simultaneously:

$$SP_C < SP_A \leq 14.0 \quad (5)$$

$$7 \leq SP_C \leq 9.4 \quad (6).$$

According to the present invention, a thermosetting powder paint composition (for example, an acrylic thermosetting powder paint composition) having storage stability, appearance properties, physical properties and chemical properties which have been difficult to be attained by the prior arts can be provided. Particularly, a thermosetting powder paint composition (for example, an acrylic thermosetting powder paint composition) which is suitably applied to painting, particularly to top painting of bodies of vehicles such as automobiles and the like and parts of vehicles such as automobiles and the like (aluminum wheel, wiper, pillar, door handle, fender, bonnet, air spoiler, stabilizer, front grill and the like) can be provided.

More specifically, the thermosetting powder paint composition of the present invention containing a novel solid flow controlling agent compounded therein enables manifestation of excellent blocking-resistance in storing of a powder paint composition simultaneously with manifestation of excellent appearance properties when the paint composition is coated to give a paint film, which has been difficult to be realized simultaneously by compounding a solid flow controlling agent of the prior art or a liquid flow controlling agent of the prior art into a powder paint composition.

DETAILED DESCRIPTION OF THE PREFERRED EMBODIMENTS

[Resin Composition Component (A)]

The resin composition (A) is not particularly restricted providing it has reactivity with the component (B) and has a solubility parameter satisfying the formula $8 \leq SP_A \leq 13$. Those materials which can be used in the thermosetting powder paint such as vinyl polymers, polyester resins, epoxy resins and the like are not particularly restricted. Preferably, vinyl polymers can be used.

[Vinyl Polymer Used in Component (A)]
[Monomer Constituting (a-1)]

In the vinyl polymer (A), the monomer constituting the component (a-1) is not particularly restricted providing it is at least one monomer which has at least one radical polymerizable unsaturated double bond in one molecule and does not have other reactive functional group than the radical polymerizable unsaturated double bond.

Specific examples of the vinyl monomer constituting the component (a-1) include acrylic acid derivatives or methacrylic acid derivatives containing acrylate or methacrylate monomers having an alkyl group 1 to 14 carbon atoms or cyclohexyl group, for example, acrylates or methacrylates such as methyl, ethyl, n-propyl, isopropyl, n-butyl, isobutyl, n-amyl, isoamyl, n-hexyl, cyclohexyl, 2-ethylhexyl, octyl, 2-ethyloctyl, decyl, dodecyl and cyclohexyl acrylates or methacrylates, and these can be used alone or in admixture or in combination of two or more.

Other specific examples of the vinyl monomer constituting the component (a-1) include other ethylenically unsaturated monomers such as aromatic vinyls such as styrene, α-methylstyrene, vinyltoluene and the like, esters of dicarboxylic acids such as maleic acid, itaconic acid and the like, halogenated ethylenically unsaturated monomers such as vinyl chloride, vinylidene chloride, vinyl fluoride, monochlorotrifluoroethylene, tetrafluoroethylene, chloroprene and the like, nitriles such as acrylonitrile, methacrylonitrile and the like, vinyl esters such as vinyl acetate, vinyl propionate and the like, (α-olefins such as ethylene, propylene, isoprene, butadiene, α-olefins having 4 to 20 carbon atoms and the like, alkyl vinyl ethers such as lauryl vinyl ether and the like, nitrogen-containing vinyls such as vinylpyrrolidone, 4-vinylpyrrolidone and the like, and these can be used alone or in admixture or in combination of two or more.

[Derivative]

The concept of the term "derivative" used in the instant application includes those obtained by substituting a hydrogen atom of specific compounds with other atom or atom group R. Herein, R is a monovalent hydrocarbon group containing at least one carbon atom, more specifically, may be an aliphatic group, alicyclic group having substantially lower degree of aromatization, combination thereof, or divalent residue obtained by bonding them via nitrogen, sulfur, silicon, phosphorus or the like, and among them, particularly, those having aliphatic structure in narrow definition are preferable. R may also be a group obtained by substitution of, for example, an alkyl group, cycloalkyl group, allyl group, alkoxy group, cycloalkoxy group, allyloxy group, halogen (F, Cl, Br or the like) group or the like on the above-described groups. By appropriately selecting these substituents, the various properties of a paint film formed by the powder paint composition of the present invention can be controlled.

It is believed that the component (a-1) contributes to improved weather-resistance, close adhesion to a substrate, and hardness of the resultant paint film.

In general, also when aromatic vinyls such as styrene and the like or conjugated dienes such as butadiene and the like are used in significant proportions (for example, 40% by weight or more based on the total amount of (A)) in the component (a-1), the weather-resistance of the resultant paint film may tend to lower, undesirably. Preferably, the amount thereof should be 20% by weight or less, further preferably 10% by weight or less. When nitrites such as acrylonitrile and the like are used in significant proportions in the component (a-1), coloring of a paint film may tend to increase, being undesirable from the standpoint of appearance.

[Monomer Constituting (a-2)]

The monomer constituting (a-2) in the vinyl-based polymer (A) is not particularly restricted providing it is at least one monomer containing in the molecule at least one radical-polymerizable unsaturated double bond and at least one non-radical polymerizable reactive functional group.

"Non-radical polymerizable reactive functional group" is a glycidyl group, epoxy group, hydroxyl group, amino group or the like and is not particularly restricted, and a glycidyl group is preferably listed.

Specific examples of the ethylenically unsaturated monomer containing in the molecule at least one glycidyl group and at least one unsaturated double bond include glycidyl methacrylate, glycidyl acrylate, β-methylglycidyl methacrylate,β-methylglycidyl acrylate, acryl glycidyl ether and the like, and these can be used alone or in combination of two or more.

[Amount of (a-2)]

The amount of (a-2) is from 20 to 60% by weight, preferably from 30 to 55% by weight, more preferably from 40 to 50% by weight based on the total amount of (a-1) and (a-2). When less than 20% by weight, scratch-resistance, acid rain-resistance and the like are poor. On the other and, when over 60% by weight, sufficient melting time can not be obtained, deteriorating appearance properties.

[Glass Transition Temperature]

The glass transition temperature of the component (A) is from 30 to 120° C., preferably from 40 to 110° C., further preferably from 50 to 100° C., in view of the storage stability of a powder paint composition, paint film smoothness due to reduction in the flowability of the paint composition in baking the powder paint, and the like. When the glass transition temperature is less than 30° C., the storage stability decreases. On the other hand, when over 120° C., preferable melt viscosity is not obtained, lowering appearance properties.

[Glass Transition Temperature]

The glass transition temperature of a polymer having a specific monomer composition can be calculated according to the Fox formula. The Fox formula is used for calculating the glass transition temperature of a copolymer based on the glass transition temperatures of the homopolymers of respective monomers constituting the copolymer, and the details thereof are described in Bulletin of the American Physical Society, Series 2, vol. 1, no. 3, pp. 123 —(1956). Regarding the glass transition temperatures of various ethylenically unsaturated monomers which are bases for evaluating the glass transition temperature of a copolymer according to the Fox formula, numerical values can be adopted described in, for example, Novel Polymer Library (Shin Kobunshi Bunko), vol. 7, Guide of Synthetic Resin for Paint (Toryo yo Goseijushi Nyumon) (Kyozo Kitaoka ed., published by Polymer Publishing Institute (Kobunshi Kankokai), Kyoto, 1974), pp. 168–169, table 10-2 (main raw material monomers of acrylic resins for paints).

[Calculation Method of Solubility Parameter]

In the present invention, solubility parameter is determined by the Fedors method. This method is described in "Polymer Engineering and Science, vol. 14, no. February, pp. 147–154, 1974".

[Solubility Parameter $SP_A$ of Resin Composition Component (A)]

The solubility parameter $SP_A$ of resin composition component (A) is within a range of 8 or more and 13 or less.

The solubility parameter $SP_A$ of resin composition component (A) is generally within a range of 7.0 to 14.0.

[Number-average Molecular Weight of Resin Composition Component (A)]

The number-average molecular weight of the component (A) is preferably from about 1,000 to about 10,000, more preferably from about 1,500 to about 5,000. When the number-average molecular weight is less than about 1,000, storage stability, physical properties and chemical properties decrease. On the other hand, when over 10,000, preferable melt viscosity is not obtained, lowering appearance properties.

As the method for controlling the molecular weight of the vinyl-based copolymer (A), there can be used means such as polymerization in the presence of a chain transfer agent of halogenated hydrocarbons such as mercaptans such as dodecylmercaptan and the like, disulfides such as dibenzoylsulfide and the like, esters of alkyl of 1 to 18 carbon atoms with thioglycolic acid such as 2-ethylhexyl thioglycolate, urea tetrabromide, and the like, or an organic solvent having large chain transfer effect such as isopropyl alcohol, isopropylbenzene, toluene and the like.

In the present invention, the number-average molecular weight can be evaluated by gel permeation chromatography (GPC) using polystyrene as a standard.

[Synthesis Method of Resin Composition Component (A)]

The synthesis method of (A) is not particularly restricted provided a component having substantially desired properties is obtained, and a solution polymerization method is suitably used.

[Hardener Component (B)]

In the present invention, the hardener component (B) is not particularly restricted providing it is a hardener having reactivity with the resin composition component (A). Preferably, the hardener component is at least one compound selected from the group consisting of polyvalent carboxylic acids and/or linear anhydrides thereof. This compound is a hardener component which reacts with an epoxy group (glycidyl group) present in the molecule of the powder paint resin composition of the present invention.

As the polyvalent carboxylic acid compound, any of aliphatic, aromatic and alicyclic compounds can be used. Specific examples of the aromatic polyvalent carboxylic acid include isophthalic acid, trimellitic acid and the like, and these can be used alone or in combination. Specific examples of the alicyclic polyvalent carboxylic acid include hexahydrophthalic acid, tetrahydrophthalic acid and the like, and these can be used alone or in combination. Also, polyester resins having a carboxyl group, and the like can be used. In the present invention, it is preferable to use an aliphatic polycarboxylic acid compound from the standpoints of paint film properties such as smoothness, weather-resistance and the like.

The concept of the term "aliphatic" used in the specification of the instant application includes not only aliphatic in narrow definition but also alicyclic having substantially lower degree of aromatization. Namely, the concept of the term "aliphatic compound" includes a group consisting of compounds having substantially lower degree of aromatization containing in the molecule a divalent hydrocarbon group having at least one carbon atom, and specifically includes a group consisting of compounds containing in the molecule not only an aliphatic group in narrow definition but also an alicyclic group having substantially lower degree of aromatization, combination thereof, or divalent residue obtained by bonding them via a hydroxyl group, nitrogen, sulfur, silicon, phosphorus and the like, and more specifically, includes a group consisting of compounds containing in the molecule a group obtained by substitution with an alkyl group, cycloalkyl group, allyl group, alkoxy group, cycloalkoxy group, allyloxy group, halogen (F, Cl, Br and the like) group or the like on the above-described group. By appropriately selecting these substituents, the various properties (heat-resistance, toughness, decomposability, strength property and the like) of the copolymer according to the present invention can be controlled. The concept of the term "aliphatic compound" used in the specification of the instant application includes not only one compound of compound but also a combination of two or more compounds.

Examples of the aliphatic polyvalent carboxylic acid compound will be described below.

[Aliphatic Polyvalent Carboxylic Acid Hardener Component]

The aliphatic polyvalent carboxylic acid is not particularly restricted provided it is an aliphatic compound substantially having at least two carboxyl groups in the molecule, and one or more of them can be used.

As the specific example of the aliphatic polyvalent carboxylic acid, aliphatic dicarboxylic acid and the like are listed. Specific examples of the aliphatic dicarboxylic acid include succinic acid, glutaric acid, adipic acid, pimelic acid, suberic acid, azelaic acid, sebacic acid, citric acid, brassilic acid, undecane dioic acid, dodecane dioic acid, eicosane dioic acid, octadecane dioic acid and the like, and among them, dodecane dioic acid is preferable, and these can be used alone or in combination.

Paint film properties such as smoothness, impact-resistance, weather-resistance and the like deteriorate when degree of aromatization increases, in an alicyclic polyvalent carboxylic acid.

[Use Amount of Hardener Component (B)]

The amount of a carboxyl group in the polyvalent carboxylic acid (B) per 1 equivalent of a glycidyl group in the component (A) is desirably from 0.3 to 1.2, preferably from 0.5 to 1.1, more preferably from 0.7 to 1.0. When the carboxyl group equivalent is less than 0.3, scratch-resistance, acid-resistance and the like decrease, and when over 1.2, appearance properties such as smoothness, sharpness and the like decrease.

[Solid Flow Controlling Agent Component (C)]
[Vinyl Polymer Used in Component (C)]

The component (C) is not particularly restricted providing it is a vinyl polymer which is solid at 20 and has a solubility parameter of 7 $SP_C<SP_A$.

[Glass Transition Temperature of (C)]

The glass transition temperature of the component (C) is preferably from 30 to 80, further preferably from 40 to 75, in view of the storage stabilities of a powder paint composition, paint film smoothness due to reduction in the flowability of the paint composition in baking the powder paint, and the like. When the glass transition temperature is less than 30, the storage stabilities decrease. On the other hand, when over 80, preferable melt viscosity is not obtained, lowering appearance properties.

[Solubility Parameter $SP_C$ of Component (C)]

The preferable numerical range of the solubility parameter $SP_C$ of the component (C) is defined by the numerical formula (1) and the numerical formula (2). In the numerical formula (1) and the numerical formula (2), $SP_A$ represents the solubility parameter of the component (A).

$$8 \leq SP_A \leq 13 \tag{1}$$

$$7 \leq SP_C < SP_A \tag{2}$$

The more preferable numerical range of the solubility parameter $SP_C$ of the component (C) is defined by the numerical formula (3) and the numerical formula (4). In the numerical formula (3) and the numerical formula (4), $SP_A$ represents the solubility parameter of the component (A).

$$8 \leq SP_A \leq 13 \qquad (3)$$

$$7 \leq SP_C < SP_A - 1.2 \qquad (4).$$

When the solubility parameter $SP_C$ of the component (C) is over than $SP_A$, the effect of the component (C) is not sufficiently manifested, and appearance properties, physical properties and chemical properties lower.

The solubility parameter $SP_C$ of the component (C) is preferably 9.4 or less, more preferably 9.1 or less, further preferably 8.9 or less.

The solubility parameter $SP_C$ of the component (C) is preferably 9.4 to 7.0, more preferably 9.1 to 7.0, further preferably 8.9 to 7.0.

Generally, when over 9.4, the effect to decrease surface tension is not sufficiently manifested and cratering-resistance, cissing-resistance and appearance properties deteriorate. Further, the effect to render a paint film hydrophobic is lost which decreases acid rain-resistance, and the effect can not be fully manifested.

The solubility parameter $SP_C$ of the component (C) is usually in a range of 7.0 to 14.0.

[Use Amount of Component (C)]

The amount of the component (C) is preferably from 0.01 to 10 parts by weight, further preferably from 0.1 to 5 parts by weight, particularly preferably from 0.5 to 2 parts by weight based on 100 parts by weight of the total weight of the component (A) and the component (B). When less than 0.01, the effect to decrease surface tension is not sufficiently manifested and cratering-resistance, cissing-resistance and appearance properties deteriorate. Further, the effect to render a paint film hydrophobic is lost which decreases acid rain-resistance, and the effect can not be fully manifested. On the other hand, when over 10 parts by weight, physical properties, chemical properties and the like lower due to reduction in cross-linked density of the surface of a paint film.

[Number-average Molecular Weight of Component (C)]

The number-average molecular weight is preferably from 1000 to 20000, further preferably from 2000 to 10000. When the molecular weight is less than 1000, physical properties, chemical properties and the like lower, and the effect is not sufficiently manifested. When over 20000, appearance properties deteriorate.

[Component (C)]

The component (C) is not particularly restricted providing it is a vinyl polymer which is solid at 20 and has a solubility parameter of 7 $SP_C < SP_A$.

In the present invention, as the component (C), (meth) acrylic polymers (for example, (meth)acrylate vinyl polymer and the like) can preferably be used.

In the present invention, as the preferable embodiment of the component (C), isobutyl methacrylate, isobornyl acrylate and the like having higher Tg and lower SP value may be listed.

As the monomer to be used for polymerization of the component (C), there may be listed ethylenically unsaturated monomers such as, acrylic acid derivatives or methacrylic acid derivatives containing acrylate or methacrylate monomers having an alkyl group 1 to 14 carbon atoms or cyclohexyl group, for example, acrylates or methacrylates such as methyl, ethyl, n-propyl, isopropyl, n-butyl, isobutyl, n-amyl, isoamyl, n-hexyl, cyclohexyl, 2-ethylhexyl, octyl, 2-ethyloctyl, decyl, dodecyl and cyclohexyl acrylates or methacrylates, aromatic vinyls such as styrene, α-methylstyrene, vinyltoluene and the like, esters of dicarboxylic acids such as maleic acid, itaconic acid and the like, halogenated ethylenically unsaturated monomers such as vinyl chloride, vinylidene chloride, vinyl fluoride, monochlorotrifluoroethylene, tetrafluoroethylene, chloroprene and the like, nitriles such as acrylonitrile, methacrylonitrile and the like, vinyl esters such as vinyl acetate, vinyl propionate and the like, α-olefins such as ethylene, propylene, isoprene, butadiene, α-olefins having 4 to 20 carbon atoms and the like, alkyl vinyl ethers such as lauryl vinyl ether and the like, nitrogen-containing vinyls such as vinylpyrrolidone, 4-vinylpyrrolidone and the like, amides such as vinylamide, acrylamide, methacrylamide and the like, hydroxyl group-containing vinyl monomers such as hydroxyethyl methacrylate, 2-hydroxypropyl methacrylate and the like, glycidyl group-containing vinyl monomers such as glycidyl methacrylate, glycidyl acrylate, β-methylglycidyl methacrylate, β-methylglycidyl acrylate, acryl glycidyl ether and the like, carboxyl group-containing vinyl monomers such as acrylic acid, methacrylic acid and the like, amino group-containing vinyl monomers such as dimethylaminoethyl methacrylate, diethylaminoethyl methacrylate and the like, and these can be used alone or in admixture or in combination of two or more.

[Synthesis Method of Component (C)]

The synthesis method of the component (C) is not particularly restricted providing a component having substantially desired property can be obtained. Emulsion polymerization, suspension polymerization and solution polymerization methods are suitably used.

[Additive]

In the method of the present invention, there are added various additives which are usually added to paints.

In the thermosetting powder paint composition of the present invention, a synthetic resin composition containing an epoxy resin, polyester resin, polyamide or the like, a natural resin or a semi-synthetic resin composition containing fibrin or fibrin derivative can be appropriately compounded according to the object to improve the appearance or physical properties of a paint film.

In the thermosetting powder paint of the present invention, additives such as a hardening catalyst, pigment, flow controlling agent, thixotropy controlling agent, charge controlling agent, surface controlling agent, gloss imparting agent, blocking-preventing agent, plasticizer, ultraviolet absorber, side opening-preventing agent, antioxidant and the like may be appropriately compounded according to the object. When used as a clear coat, a small amount of a pigment may also be compounded for coloration to such extent that hiding property is not manifested completely.

[Regarding Kneading of Powder Paint Composition]

When a composition containing the resin composition component (A), the hardener component (B) and the solid flow controlling agent component (C) is mechanically kneaded, the temperature of the composition to be kneaded is not particularly restricted providing a substantially uniform powder paint composition can be prepared. As the melt-kneading apparatus, a heat roll, heat kneader, extruder and the like are usually used.

The component (C) is previously dispersed uniformly in the component (A), then the component (B) is mixed with this, and the mixture can be kneaded according to the above-described method and the like. As the specific example of the method for previously dispersing the component (C) uniformly in the component (A), there are listed, for example, a method in which the component (C) and the component (A) are dissolved at given temperature and mixed, a method in which the component (C) and the component (A) are dissolved using a suitable organic solvent, then, the solvent is removed, as well as other methods.

Specific examples of the method for compounding the thermosetting powder paint composition of the present invention include, but are not limited to, methods in which, for example, kneading machines and mixing machines such as a roll, kneader, mixer (Banbury type, transfer type and the like), calendering apparatus, extruder and the like are appropriately combined, conditions of respective steps (temperature, melting or non-melting, revolution, vacuum atmosphere, inert gas atmosphere and the like) are appropriately set, mixing is conducted fully uniformly, then, a powder paint composition in the form of a fine powder is obtained by a grinding apparatus.

[Regarding Grinding of Powder Paint Composition]

A paint in the form of a block obtained by kneading is cooled before ground to give an average particle size from about 10 to 90 μm. Specific examples of the grinding apparatus used included a hammer mill and the like.

[Coating Method and Baking Method]

A powder paint obtained by grinding is subjected to a coating method such as a static coating method, flow immersion method and the like to allow the powder of the thermosetting powder paint composition to adhere to a subject to be coated, and this is heated for thermosetting to form a paint film. The thermosetting powder paint composition of the present invention can be baked usually at a temperature from about 100° C. to about 180° C., more preferably at from about 120° C. to about 160° C. for usually about 10 minutes to about 60 minutes, to conduct cross-linking reaction. After the baking, the composition is cooled to room temperature, then, a paint film having excellent properties can be obtained.

When the thermosetting powder paint composition of the present invention is used as a top coating, even if not only a conventional solvent type paint but also an aqueous paint is used as the primer paint thereof, a paint film after baking the paint of the present invention has excellent properties as in the case using a solvent type paint.

Namely, an aqueous primer paint (including a pigment-containing paint and/or a metal powder-containing paint) is coated, dried for given time, then, the thermosetting powder paint composition of the present invention is allowed to adhere onto the primer paint according to the above-described method, and the composition is heated for hardening to form a paint film.

The method for coating the thermosetting powder paint composition of the present invention is applied also to bodies or parts of automobiles (aluminum wheel, wiper, center pillar and the like).

A paint film formed by a suitable or known publicly-used coating method using the thermosetting powder paint composition of the present invention has excellent abilities regarding storage stability (blocking-resistance and the like), appearance properties (cratering-resistance, cissing-resistance, smoothness, clearness and the like), physical properties (hardness, scratch-resistance and the like) and chemical properties (weather-resistance, acid-resistance, solvent-resistance and the like).

EXAMPLE

In the specification of the instant application, production examples, examples and embodiments are to help an understanding of the invention of the instant application and should not be construed to limit the scope of the present invention.

"Parts" and "%" in the descriptions are by weight unless otherwise stated.

[Preparation of Coated Plate]

A polyester-melamine cross-linked black paint was coated in a thickness of 20 μm on a bonderized steel plate having a thickness of 0.8 mm on which a zinc phosphating process had been performed, then, the coated film was baked at 170° C. for 30 minutes to prepare a primer-treated steel plate.

[Evaluation of Ability]

Evaluations of abilities were conducted as follows.

① Blocking-resistance test of powder paint 6.0 g of a powder paint was placed in a cylindrical vessel having an internal diameter of 20 mm, stored at 30 for 7 days, then, the powder was taken out and the blocking condition of the powder paint was observed by eyes and finger touch, and evaluated by ⊚ through x.

⊚ no failure at all

○ somewhat inferior x inferior

② Visual appearance (smoothness, sharpness)

The appearance of a film was judged visually, and evaluated by ⊚ through x.

⊚ particularly excellent

○ excellent x inferior

③ Gloss

It was represented by measured (60° gloss) value by a gloss meter.

④ Cratering-resistance

The cratering of a film was judged visually, and evaluated by ○ and x.

○ Cratering recognized x No cratering

⑤ Paint film hardness test

It was evaluated by pencil scratch test (according to JIS K5400 6.14). Indication was represented by pencil hardness mark.

⑥ Scratch-resistance

A scratch test was conducted in which the surface of a paint film was rubbed with a brush using a 3% abrasive suspension, and evaluation of gloss (20° gloss) was conducted before and after the rubbing, and gloss retention was calculated.

The gloss retention was evaluated by ⊚, ○ and x.

⊚ 60% or more

○ 40% or more and less than 60% x less than 40%

⑦ Acid rain-resistance

10% by volume of sulfuric acid was dropped on the surface of a paint film, and left for one day at room temperature. Then, the sulfuric acid drop was wiped off, and appearance was observed and evaluated by ⊚, ○ and x.

⊚ no imprint

○ extremely slight imprint x imprint recognized

⑧ Solvent-resistance

The surface of a paint film was rubbed back and forth 50 times with a gauze impregnated with xylol, then, the paint film was observed and evaluated by ⊚, ○ and x.

⊚ no imprint

○ extremely slight imprint x imprint recognized

⑧ Weather-resistance test 2000 hours promotion test was conducted using a QUV tester, and glossiness of the paint film was measured before and after the promotion test to give gloss remaining ratio (%). The gloss remaining ratio was calculated according to the following formula.

Gloss remaining ratio [%]=(20° glossiness after irradiation)÷(20° glossiness before irradiation)×100

Vinyl Polymer (A) Production Examples 1 to 3

Into a four-necked flask equipped with a stirrer, thermometer, reflux condenser and nitrogen introducing tube was charged 66.7 parts of xylene, and was heated to reflux temperature. 6.0 parts of tert-butyl peroxy-2-ethyl hexanoate as a polymerization initiator was dissolved in monomers (parts) shown in Table 1 and the mixed solution was added dropwise into the xylene in the flask over 5 hours, and subsequently kept at 100 for 5 hours. The solvent in the resulted polymerization solution was removed to obtain a vinyl copolymer (Production Examples 1 to 3). The properties of the resulted copolymers are also described in Table 1.

Vinyl Polymer (A) Comparative Production Examples 1, 2

Into a four-necked flask equipped with a stirrer, thermometer, reflux condenser and nitrogen introducing tube was charged 66.7 parts of xylene, and heated to reflux temperature. 6.0 parts of tert-butyl peroxy-2-ethyl hexanoate as a polymerization initiator was dissolved in monomers (parts) shown in Table 2 and the mixed solution was added dropwise into the xylene in the flask over 5 hours, further, subsequently kept at 100 for 5 hours. The solvent in the resulted polymerization solution was removed to obtain a vinyl copolymer (Comparative Production Examples 1, 2). The properties of the resulted copolymers are also described in Table 2.

Vinyl Polymer (C) Production Examples 1 to 7

Into a four-necked flask equipped with a stirrer, thermometer, reflux condenser and nitrogen introducing tube was charged 66.7 parts of xylene, and heated to reflux temperature. 1.2 parts of tert-butyl peroxy-2-ethyl hexanoate as a polymerization initiator was dissolved in a monomer or monomers (parts) shown in Table 3 and the mixed solution was added dropwise into the xylene in the flask over 5 hours, further, subsequently kept at 100 for 5 hours. The solvent in the resulted polymerization solution was removed to obtain a vinyl-based copolymer (Production Examples 1 to 7). The properties of the resulted copolymers are also described in Table 3.

Vinyl Polymer (C) Comparative Production Examples 1 to 5

Into a four-necked flask equipped with a stirrer, thermometer, reflux condenser and nitrogen introducing tube was charged 66.7 parts of xylene, and heated to reflux temperature. 1.2 parts of tert-butyl peroxy-2-ethyl hexanoate as a polymerization initiator was dissolved in a monomer or monomers (parts) shown in Table 4 and the mixed solution was added dropwise into the xylene in the flask over 5 hours, further, subsequently kept at 100 for 5 hours. The solvent in the resulted polymerization solution was removed to obtain a vinyl-based copolymer (Comparative Production Examples 1 to 5). The properties of the resulted copolymers are also described in Table 4.

EXAMPLES 1 TO 11

The resin composition component (A) (Production Examples 1 to 3) and (B) were mixed in ratio (parts) as shown in Table 5, and to 100 parts by weight of the total amount of the components (A) and (B) were added the solid flow controlling agent (C) (Production Examples 1 to 7) in a ratio (parts) shown in Table 5, 1 part of Tinuvin 144 (manufactured by Ciba Geigy, photo stabilizer) and 1 part of Benzoin (side opening-preventing agent) an 2 parts of Tinuvin 900 (manufactured by Ciba Geigy, ultraviolet absorber), and the mixture was melt-kneaded under condition of 90 by a heat roll, cooled, then, ground finely by a grinding machine, and fractions passed through a 150 mesh sieve were collected to obtain a powder paint. The powder paint was coated by an electrostatic spray on a primer-treated steel plate to give a paint film of 60 to 70 μm, then, the paint film was heated at 150 for 30 minutes to obtain a test plate.

Comparative Examples 1 to 10

A test plate was obtained in the same manner as in Example 1 except that the vinyl copolymer (A) (Production Examples 1 to 2) or (A) Comparative Production Examples 1 to 2 and (B) were mixed in ratio (parts) as shown in Table 6, and to 100 parts by weight of the total amount of the components (A) or (A) Comparative Production Example and (B) was added the solid flow controlling agent (C) (Production Example 1) or (C) Comparative Production Example (Comparative Production Examples 1 to 5 or BYK360P) in a ratio (parts) shown in Table 6.

Example, Comparative Example Evaluation Results

Results of evaluation of the powder paints and the paint films produced in Examples 1 to 11 are shown in Table 7. Also, results of evaluation of the powder paints and the paint films produced in Comparative Examples 1 to 10 relating to Examples 1 to 11 are shown in Table 8. Powder paint compositions of Examples 1 to 11 shown in Table 7 satisfy the numerical ranges according to the present invention, and these results indicate that the present invention is a thermosetting powder paint composition which can give a paint film having excellent storage stability (blocking-resistance and the like), appearance properties (cratering-resistance, smoothness, sharpness and the like), physical properties (hardness, scratch-resistance and the like) and chemical properties (weather-resistance, acid-resistance, solvent-resistance and the like).

In Comparative Examples 1 and 2, the amount of (a-2) is out of the range defined in the claims of the present invention, and in this case, when less than the claimed range, scratch-resistance and solvent-resistance were poor. On the other hand, when over the claimed range, appearance was poor.

In Comparative Examples 3 and 4, the amount of (C) is out of the range defined in the claims of the present invention, and when less than the claimed range, appearance, cratering-resistance and acid-resistance were poor. On the other hand, when over the claimed range, scratch-resistance, acid-resistance and solvent-resistance were poor.

In Comparative Example 5, the solubility parameter is over $(SP_A-1)$, and appearance and cratering-resistance were poor.

In Comparative Examples 6, 7 and 8, the glass transition temperature of (C) is out of the range defined in the claims of the present invention, and in this case, when less than the claimed range, blocking-resistance was poor. On the other hand, when over the claimed range, and appearance and cratering-resistance were poor.

In Comparative Example 9, (C) is a component having a reactive group to (B), and when (C) has a surplus amount of reactive groups, appearance and cratering-resistance decreased.

In Comparative Example 10, a liquid acryl polymer was adsorbed on silica to obtain a solid flow controlling agent which was used. In this case, appearance and cratering-resistance were inferior.

Table 7 shows evaluation results of Examples 1 to 11.

Table 8 shows evaluation results of Comparative Examples 1–10.

TABLE 1

Resin composition component (A)
Production Examples 1 to 3

|  |  | Production Example 1 | Production Example 2 | Production Example 3 |
|---|---|---|---|---|
| (a-1) (part) | Styrene | 25.0 | 15.0 | 5.0 |
|  | Methyl methacrylate | 40.0 | 40.0 | 40.0 |
|  | n-Butyl methacrylate | 5.0 | 5.0 | 5.0 |
| (a-2) (part) | Glycidyl methacrylate | 30.0 | 40.0 | 50.0 |
| Solubility parameter $SP_A$ of (A) |  | 10.3 | 10.3 | 10.2 |
| Glass transition temperature (° C.) of (A) |  | 79 | 73 | 68 |
| Epoxy equivalent of (A) (g/eq) ※1 |  | 500 | 375 | 300 |
| Number-average molecular weight of (A) (Mn) |  | 2400 | 2600 | 2800 |

※1: Epoxy equivalent; according to perchloric acid titration method

TABLE 2

Resin composition component (A)
Comparative Production Examples 1, 2

|  |  | Comparative Production Example 1 | Comparative Production Example 2 |
|---|---|---|---|
| (a-1) (part) | Styrene | 30.0 | 5.0 |
|  | Methyl methacrylate | 40.0 | 25.0 |
|  | n-Butyl methacrylate | 15.0 | 5.0 |
| (a-2) (part) | Glycidyl methacrylate | 15.0 | 65.0 |
| Solubility parameter $SP_A$ of (A) |  | 10.3 | 10.0 |
| Glass transition temperature (° C.) of (A) |  | 79 | 60 |
| Epoxy equivalent of (A) (g/eq) |  | 1000 | 225 |
| Number-average molecular weight of (A) (Mn) |  | 2400 | 3000 |

TABLE 3

Solid flow controlling agent component (C)
Production Examples 1 to 7

|  |  | Production Example | | | | | | |
|---|---|---|---|---|---|---|---|---|
|  |  | 1 | 2 | 3 | 4 | 5 | 6 | 7 |
| Monomer composition (part) | Methyl methacrylate |  | 20 |  |  |  |  |  |
|  | Isobutyl methacrylate | 100 | 80 | 40 | 87 | 96 | 85 | 70 |
|  | 2-Ethylhexyl acrylate |  |  |  | 13 |  |  |  |
|  | Isobornyl acrylate |  |  | 60 |  |  |  |  |
|  | Glycidyl methacrylate |  |  |  |  | 4 | 15 | 30 |

TABLE 3-continued

Solid flow controlling agent component (C)
Production Examples 1 to 7

|  | Production Example | | | | | | |
|---|---|---|---|---|---|---|---|
|  | 1 | 2 | 3 | 4 | 5 | 6 | 7 |
| Solubility parameter SPc | 8.6 | 9.1 | 8.5 | 8.6 | 8.6 | 8.8 | 8.9 |
| Glass transition temperature (° C.) | 53 | 67 | 76 | 34 | 52 | 51 | 50 |

TABLE 4

Solid flow controlling agent component (C)
Comparative Production Examples 1 to 5

|  |  | Comparative Production Example | | | | |
|---|---|---|---|---|---|---|
|  |  | 1 | 2 | 3 | 4 | 5 |
| Monomer composition (part) | Methyl methacrylate | 30 |  |  |  |  |
|  | Isobutyl methacrylate | 70 | 20 | 80 |  | 40 |
|  | 2-Ethylhexyl acrylate |  |  | 20 | 100 |  |
|  | Isobornyl acrylate |  | 80 |  |  |  |
|  | Glycidyl methacrylate |  |  |  |  | 60 |
| Solubility parameter SPc |  | 9.4 | 8.4 | 8.6 | 8.4 | 9.1 |
| Glass transition temperature (° C.) |  | 67 | 84 | 25 | −70 | 50 |

TABLE 5

Paint composition in Examples 1 to 11

| | | Resin composition component (A) | Hardener component (B) | Solid flow controlling agent component (C) |
|---|---|---|---|---|
| Example | 1 | (A) Production Example 1<br>83.6 | Dodecane dioic acid<br>16.4 | (C) Production Example 1<br>1.0 |
|  | 2 | (A) Production Example 2<br>79.3 | Dodecane dioic acid<br>20.7 | (C) Production Example 1<br>1.0 |
|  | 3 | (A) Production Example 3<br>75.4 | Dodecane dioic acid<br>24.6 | (C) Production Example 1<br>1.0 |
|  | 4 | (A) Production Example 2<br>79.3 | Dodecane dioic acid<br>20.7 | (C) Production Example 1<br>0.1 |
|  | 5 | (A) Production Example 2<br>79.3 | Dodecane dioic acid<br>20.7 | (C) Production Example 1<br>5.0 |
|  | 6 | (A) Production Example 2<br>79.3 | Dodecane dioic acid<br>20.7 | (C) Production Example 2<br>1.0 |
|  | 7 | (A) Production Example 2<br>79.3 | Dodecane dioic acid<br>20.7 | (C) Production Example 3<br>1.0 |
|  | 8 | (A) Production Example 2<br>79.3 | Dodecane dioic acid<br>20.7 | (C) Production Example 4<br>1.0 |
|  | 9 | (A) Production Example 2<br>79.3 | Dodecane dioic acid<br>20.7 | (C) Production Example 5<br>1.0 |
|  | 10 | (A) Production Example 1<br>83.6 | Dodecane dioic acid<br>16.4 | (C) Production Example 6<br>1.0 |

TABLE 5-continued

Paint composition in Examples 1 to 11

| | Resin composition component (A) | Hardener component (B) | Solid flow controlling agent component (C) |
|---|---|---|---|
| 11 | (A) Production Example 1 83.6 | Dodecane dioic acid 16.4 | (C) Production Example 7 1.0 |

TABLE 6

Paint composition in Comparative Examples 1 to 10

| | | Resin composition component (A) | Component (A) Comparative Example | Hardener component (B) | Solid flow controlling agent component (C) | Component (C) Comparative Example |
|---|---|---|---|---|---|---|
| Comparative Example | 1 | | (A) Comparative Production Example 1 91.1 | Dodecane Dioic acid 8.9 | (C) Production Example 1 1.0 | |
| | 2 | | (A) Comparative Production Example 2 69.7 | Dodecane Dioic acid 30.3 | (C) Production Example 1 1.0 | |
| | 3 | (A) Production Example 2 79.3 | | Dodecane Dioic acid 20.7 | (C) Production Example 1 0.01 | |
| | 4 | (A) Production Example 2 79.3 | | Dodecane Dioic acid 20.7 | (C) Production Example 1 15.0 | |
| | 5 | (A) Production Example 2 79.3 | | Dodecane Dioic acid 20.7 | | (C) Comparative Production Example 1 1.0 |
| | 6 | (A) Production Example 2 79.3 | | Dodecane Dioic acid 20.7 | | (C) Comparative Production Example 2 1.0 |
| | 7 | (A) Production Example 2 79.3 | | Dodecane Dioic acid 20.7 | | (C) Comparative Production Example 3 1.0 |
| | 8 | (A) Production Example 2 79.3 | | Dodecane Dioic acid 20.7 | | (C) Comparative Production Example 4 1.0 |
| | 9 | (A) Production Example 1 83.6 | | Dodecane Dioic acid 16.4 | | (C) Comparative Production Example 5 1.0 |
| | 10 | (A) Production Example 2 79.3 | | Dodecane Dioic acid 20.7 | | BYK 360P✕ 1.7 |

✕flow controlling agent manufactured by BYK Chemie (liquid acryl polymer is adhered on silica to give solid flow controlling agent.)

TABLE 7

Evaluation results in Examples

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Blocking-resistance | ○ | ⊚ | ⊚ | ⊚ | ⊚ | ⊚ | ⊚ | ○ | ⊚ | ⊚ | ⊚ |
| Appearance | ⊚ | ⊚ | ⊚ | ⊚ | ⊚ | ⊚ | ○ | ⊚ | ⊚ | ○ | ○ |
| Gloss (60° gloss) | 92 | 92 | 91 | 91 | 92 | 92 | 92 | 92 | 92 | 92 | 92 |
| Cratering-resistance | ○ | ○ | ○ | ○ | ○ | ○ | ○ | ○ | ○ | ○ | ○ |
| Paint film hardness | H | H | H | H | H | H | H | H | H | H | H |
| Scratch-resistance | ○ | ⊚ | ⊚ | ⊚ | ○ | ○ | ⊚ | ⊚ | ⊚ | ⊚ | ⊚ |
| Acid-resistance | ○ | ⊚ | ⊚ | ○ | ○ | ○ | ⊚ | ⊚ | ⊚ | ⊚ | ⊚ |
| Solvent-resistance | ○ | ⊚ | ○ | ○ | ○ | ○ | ⊚ | ⊚ | ⊚ | ⊚ | ⊚ |
| Weather-resistance, Gloss retention (%) | 91 | 92 | 93 | 92 | 91 | 92 | 92 | 92 | 92 | 92 | 93 |
| General evaluation | ○ | ⊚ | ⊚ | ⊚ | ○ | ○ | ⊚ | ⊚ | ⊚ | ⊚ | ⊚ |

General evaluation: When number of ⊚ is larger than number of ○, general evaluation is ⊚, and when number of ⊚ is smaller than number of ○, general evaluation is ○.

TABLE 8

Evaluation results of Comparative Examples

| | Comparative Example | | | | | | | | | |
|---|---|---|---|---|---|---|---|---|---|---|
| | 1 | 2 | 3 | 4 | 5 | 6 | 7 | 8 | 9 | 10 |
| Blocking-resistance | X | ⊚ | ⊚ | ⊚ | ⊚ | ⊚ | X | X | ○ | ⊚ |
| Appearance | ⊚ | X | X | ⊚ | X | X | ⊚ | ⊚ | X | X |
| Gloss (60° gloss) | 92 | 92 | 92 | 92 | 92 | 92 | 92 | 92 | 92 | 92 |
| Cratering-resistance | ○ | ○ | X | ○ | X | X | ○ | ○ | X | X |
| Paint film hardness | F | H | H | F | H | H | H | H | H | H |
| Scratch-resistance | X | ⊚ | ○ | X | ○ | ○ | ⊚ | ⊚ | ○ | ○ |

TABLE 8-continued

Evaluation results of Comparative Examples

| | Comparative Example | | | | | | | | | |
|---|---|---|---|---|---|---|---|---|---|---|
| | 1 | 2 | 3 | 4 | 5 | 6 | 7 | 8 | 9 | 10 |
| Acid-resistance | X | ◎ | X | X | ○ | ○ | ◎ | ◎ | ○ | ○ |
| Solvent-resistance | X | ◎ | ◎ | X | ◎ | ◎ | ◎ | ◎ | ◎ | ◎ |
| Weather-resistance, Gloss retention (%) | 91 | 93 | 92 | 91 | 92 | 92 | 92 | 93 | 93 | 92 |
| General evaluation | X | Δ | X | X | Δ | Δ | Δ | Δ | Δ | Δ |

General evaluation: When number of x is 1 to 2, general evaluation is Δ, and when number of x is 3 or more, general evaluation is x.

What is claimed is:

1. A thermosetting powder paint composition comprising (A) a resin composition component, (B) a hardener component and (C) a solid flow controlling component which is solid at 20° C., wherein said component (A) contains a resin composition component having reactivity with the component (B), said component (B) contains a hardener having reactivity with the component (A), said component (C) contains a vinyl-based polymer, and the relation between the solubility parameter $SP_A$ of the component (A) and the solubility parameter $SP_C$ of the component (C) satisfies the following numerical formula (3) and the following numerical formula (4) simultaneously:

$$8 \leq SP_A \leq 13 \quad (3)$$

$$7 \leq SP_C < SP_A - 1.2 \quad (4).$$

2. The thermosetting powder paint composition according to claim 1 wherein the composition ratio of the resin composition component (A), the hardener component (B) and the solid flow controlling agent component (C) is controlled so that the amount of the component (C) is from 0.01 to 10% by weight based on the total weight of the component (A) and the component (B).

3. The thermosetting powder paint composition according to claim 2 wherein the resin composition component in the component (A) includes a vinyl polymer.

4. The thermosetting powder paint composition according to claim 1 wherein the resin composition component in the component (A) includes a vinyl polymer.

5. The thermosetting powder paint composition according to claim 3 wherein the vinyl polymer in the component (A) includes a (meth)acrylate vinyl polymer.

6. The thermosetting powder paint composition according to claim 4 wherein the vinyl polymer in the component (A) includes a (meth)acrylate vinyl polymer.

7. The thermosetting powder paint composition according to claim 5 wherein the (meth)acrylate vinyl polymer in the component (A) is obtained by polymerization in a reaction system comprising (a-1) at least one (meth)acrylate monomer which has at least one radical polymerizable unsaturated double bond in one molecule and does not have other reactive functional groups than the radical polymerizable unsaturated double bond, and (a-2) at least one (meth)acrylate monomer which has at least one radical polymerizable unsaturated double bond and at least one non-radical polymerizable functional group having reactivity with the hardener component (B) together in one molecule.

8. The thermosetting powder paint composition according to claim 6 wherein the (meth)acrylate vinyl polymer in the component (A) is obtained by polymerization in a reaction system comprising (a-1) at least one (meth)acrylate monomer which has at least one radical polymerizable unsaturated double bond in one molecule and does not have other reactive functional groups than the radical polymerizable unsaturated double bond, and (a-2) at least one (meth)acrylate monomer which has at least one radical polymerizable unsaturated double bond and at least one non-radical polymerizable functional group having reactivity with the hardener component (B) together in one molecule.

9. The thermosetting powder paint composition according to claim 5 wherein the non-radical polymerizable functional group having reactivity with the hardener component (B) in the component (a-2) is a glycidyl group.

10. The thermosetting powder paint composition according to claim 6 wherein the non-radical polymerizable functional group having reactivity with the hardener component (B) in the component (a-2) is a glycidyl group.

11. The thermosetting powder paint composition according to claim 7 wherein the amount of the component (a-2) is from 20 to 60 parts by weight based on 100 parts by weight of the total weight of the component (a-1) and the component (a-2).

12. The thermosetting powder paint composition according to claim 8 wherein the amount of the component (a-2) is from 20 to 60 parts by weight based on 100 parts by weight of the total weight of the component (a-1) and the component (a-2).

13. The thermosetting powder paint composition according to claim 1 wherein the resin composition component in the component (A) has a glass transition temperature from 30 to 120° C.

14. The thermosetting powder paint composition according to claim 1 wherein the hardener in the component (B) includes a polyvalent carboxylic acid and/or linear anhydride thereof.

15. The thermosetting powder paint composition according to claim 14 wherein the polyvalent carboxylic acid in the component (B) is an aliphatic polyvalent carboxylic acid.

16. The thermosetting powder paint composition according to claim 1 wherein the vinyl polymer in the component (C) has a glass transition temperature (Tg) from 30 to 80° C.

17. The thermosetting powder paint composition according to claim 1 wherein the vinyl polymer in the component (C) includes a (meth)acrylate vinyl polymer.

18. The thermosetting powder paint composition according to claim 1 wherein the vinyl polymer in the component (C) is composed only of a (meth)acrylate vinyl polymer.

19. The thermosetting powder paint composition according to claim 1 wherein the vinyl polymer in the component (C) has a number average molecular weight from 1000 to 20000.

20. The thermosetting powder paint composition according to claim 1 wherein the relation between the solubility parameter $SP_A$ of the component (A) and the solubility parameter $SP_C$ of the component (C) satisfies the following numerical formula (5) and the following numerical formula (6) simultaneously:

$$SP_C < SP_A \leq 14.0 \quad (5)$$

$$7 \leq SP_C \leq 9.4 \quad (6).$$

* * * * *